April 2, 1957      B. AUER      2,787,085

CASTER CUPS

Original Filed Dec. 29, 1949

Inventor.
Betty Auer.
By ...... Atty.

United States Patent Office 2,787,085
Patented Apr. 2, 1957

2,787,085

CASTER CUPS

Betty Auer, Chicago, Ill.

Original application December 29, 1949, Serial No. 135,815, now Patent No. 2,699,628, dated January 18, 1955. Divided and this application November 12, 1954, Serial No. 468,197

2 Claims. (Cl. 45—137)

This invention is concerned with caster cups and may be considered a division of my copending application Serial No. 135,815, filed December 29, 1949 (now Patent No. 2,699,628, dated January 18, 1955) as a continuation-in-part of prior application Serial No. 118,634, filed September 29, 1949, which has become abandoned.

The invention furnishes improved supports of the caster cup type, for musical instruments and other equipment or furniture, which provide among others the following advantages, namely, first, a relatively large contact area with the supporting surface, floor or floor covering, thereby protecting the material of the supporting surface against damage; second, fixing the supported piece of equipment against displacement; third, elevating the supported piece of equipment by a very small, practically negligible amount, thus, for example, preventing interference with vacuum cleaning of the supporting surface or its covering and, in the case of upright pianos or spinets which are usually standing against a wall and need caster supports only underneath the front legs, preventing visible rearward tilting of the instrument; fourth, counteracting angular forces set up, for example, in playing a piano, to prevent creeping of the instrument and consequent bulging of the floor covering such as a rug or carpet underneath the caster support; fifth, damping the transmission of vibrations from the supported piece of equipment, for example, a musical instrument, to the supporting surface, thereby contributing to improvement of the tone quality thereof; and sixth, furnishing supports which have decorative functions in addition to their utilitarian aspects.

Figure 9:
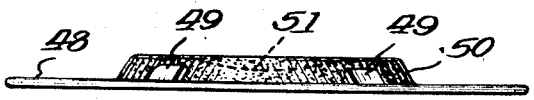
Figure 10:
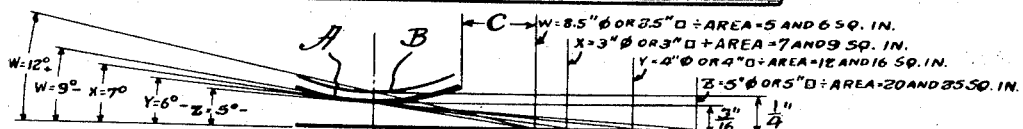

The foregoing and other objects and features of the invention will appear from the description of the embodiments which is rendered below with reference to the accompanying diagrammatic drawings, wherein Figs. 1–8 show various embodiments of the invention each in diagrammatic cross-sectional view;

Fig. 9 illustrates a further embodiment in diagrammatic elevational side view; and Fig. 10 is a diagram to aid in explaining the operation of the invention.

It is assumed that each structure shown in the drawings is either circular and has a diameter of approximately 4 inches, or that it is approximately 4 inches square.

Referring now to the drawings: The device shown in Fig. 1 comprises a relatively thin top plate 11 made of suitable relatively rigid material, for example, stainless steel or aluminum, and forming a central depression 12 for receiving the load-bearing element such as a caster wheel or caster button of a piece of furniture, piano or other equipment, and for holding the loadbearing element against lateral displacement. Suitably secured, that is, molded or molecularly bonded to this plate 11 and forming a unitary structure therewith, is a bottom layer 13 of a relatively elastic or resilient material such as rubber or a rubberlike composition. The peripheral portion of the top plate may be turned slightly downwardly to embrace a portion of the layer 13 peripherally thereof.

The exposed top surface of the plate 11, as well as the exposed surfaces of corresponding elements in some of the remaining embodiments, may be finished as desired, polished or buffed, or anodized in desired colors for any intended decorative effect, for example, any intended rug-matching or color contrasting effect.

Figure 1:

The structure shown in Fig. 1 as well as each of the structures shown in the remaining figures, assumed to be circular or square, may of course assume other shapes, for example, rectangular, elliptic, oblong or any other desired and suitable shape, and the corresponding central depressions shown in the various embodiments, such as the depression 12 shown in Fig. 1, may likewise be made to assume any desired and suitable outline.

The top plate 11 may be less than $1/16''$ thick, and the amount of expensive metal is thus kept at a minimum. The structure is neat in appearance, relatively thin, its thickness being less than $1/4''$ throughout any portion thereof. The device is also easy to manufacture and fulfills the previously indicated functions, whether it is used on a floor covering or directly in contact with a floor.

Figure 2:
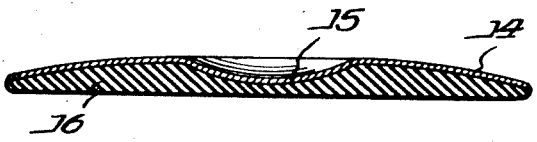

The embodiment illustrated in Fig. 2 is assumed to be circular in shape. It comprises a generally dome-shaped or inverted dish-shaped relatively thin metallic plate 14 forming the central depression 15. The underside may be filled with a layer 16 of rubber or rubberlike material having the characteristics mentioned before. The load will be effectively distributed, due to the dome shape of the plate 14. The structure will yield the intended advantages just like the embodiment shown in Fig. 1. Its thickness at any point may be less than $3/8''$.

If the structure shown in Fig. 2 is to be made rectangular or the like instead of circular, this may be done by forming, for example, four flat sides which converge upwardly to produce a flat pyramid. The term "dome-shaped" is intended to cover a circular structure such as shown in Fig. 2, as well as a structure made in the form of such flat pyramid or the like.

Figure 3:

Fig. 3 illustrates a modification which furnishes the functions and features of Fig. 2, while requiring less material for the resilient bottom padding. The top plate forms, in this case, an elevated portion 17 which surrounds the central depression 18 and a flangelike peripheral portion 19. Underneath the top plate is again the resilient bottom layer or padding, as indicated in Fig. 3 by numeral 20. Reinforcing ribs 21 may be provided, if desired, to assist in carrying and downwardly distributing the load. These ribs in a circular structure may extend from the elevated portion 17 radially outwardly to the edge of the top plate, and in an angular structure they may extend from the elevated inner portion 17 outwardly to the corners of the top plate. The corners of the device may be suitably rounded to present a neat and smooth appearance.

Figure 4:
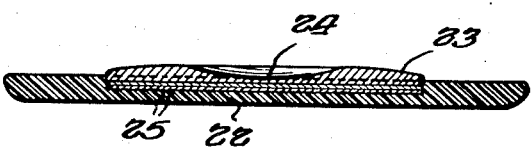

The structure shown in Fig. 4 comprises a base plate 22 suitably shaped, as already explained, which is made of synthetic material, such as Lucite, nylon, Plexiglas or the like. These materials may be made of opaque or translucent, and in practically any color, to achieve desired decorative effects. They may be easily machined or molded in any desired shape.

The base plate 22 of Fig. 4 is provided with a recess in which is disposed the top plate 23 made of suitable rigid material, for example, metal such as stainless steel or aluminum, and forming again a central depression 24 for receiving and holding the loadbearing element. The top plate 23 may be removable from the base plate 22 and shims, as indicated at 25, may be used to adjust its position in and on the top plate. This may be desired, for example, in connection with musical instruments, for putting them in level position on slightly sloping floors.

The load on the rigid member 23 is evenly distributed downwardly to the base plate 22, which by its inherent rigidity transmits the load in turn to the supporting surface underneath and over substantially its entire bottom area, just as in the case of the structures already discussed. The importance of actually using substantially the entire bottom contact area of the device in engagement with a supporting surface will be realized from the explanations given before.

The device of Fig. 4 may be used in contact with a floor covering. If desired, a bottom rubber layer may of course be provided.

Figure 5:
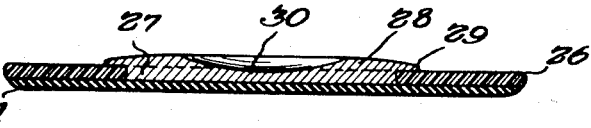

The embodiment represented in Fig. 5 is similar to the one shown in Fig. 4, but uses less material for the base plate 26, which is made in the form of an angular relatively thin ringlike member in the central aperture of which is disposed the shank 27 of the generally mushroom-shaped top plate 28 forming the annular flange 29 and the central depression 30. The annular base member 26 forms with the shank 27 a bottom surface to which is suitably bonded the resilient bottom layer 31. The top plate 28 may be removable from the remainder of the structure or fixedly attached, as desired.

Figure 6:
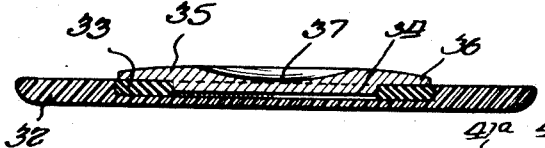

The device illustrated in Fig. 6 comprises a base member 32 which corresponds essentially to the base member 22 of Fig. 4, having a recess in which is disposed a resilient ringlike insert 33 made of rubber or the like, forming in turn a central aperture which accommodates the shank 34 of the generally mushroom-shaped top plate member 35, the latter forming the peripheral flange 36 and the central depression 37. The bottom of the stem of the mushroom-shaped top plate forms a cavity with the base member 32 to enhance the damping feature of the device. This particular structure may be used with good effect on floor coverings as well as in direct contact with a floor. The top plate may again be either removable or may be in fixed position with respect to the other elements of the device.

Figures 7, 7A:
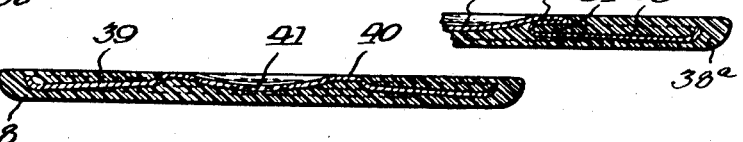
Figure 8:
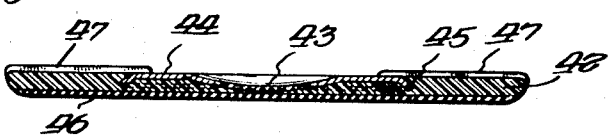

The embodiments made in accordance with Figs. 7 and 8 are particularly suitable for molding processes, Fig. 7, if used for supporting a vibrating structure such as a piano, being adapted to give best results in contact with a floor covering, and the device made in accordance with Fig. 8 being adapted for effectively supporting such vibrating structure in contact with either a floor or a floor covering. It will be appreciated of course that a floor covering, rug or the like will function as a medium for damping vibrations if it is contacted over a relatively large area by devices of the present invention.

Referring now to Fig. 7: The device comprises a base plate 38, made of moldable material, for example, rubber or the like, or of material of the class of materials including Lucite, nylon, Plexiglas or the like. Molded into and molecularly bonded to the body of the plate 38 is the angular flangelike extension 39 of the thin metallic top plate which forms an elevated portion 40 surrounding a central depression 41.

The device made in accordance with Fig. 8 is similar to the one shown in Fig. 7, and in a sense also similar to the structure shown in Fig. 5, comprising, as it does, an annular base plate 42 which may again be made of material of the class of Lucite, Plexiglas or nylon. The load-receiving top plate having the central depression 43 forms a flange 44 which terminates in an angular portion 45. The latter is embedded in and molecularly bonded to the body of the ringlike annular base member 42. The top surface of the flange 44 is substantially flush with the top surface of the base plate member 42, and the bottom of the top plate forming the depression 43 is substantially flush with its bottom surface. On its underside, the structure is provided with a resilient padding, for example, a suitable rubber padding 46, as already discussed in connection with other embodiments. Reinforcing ribs 47 may be provided, if desired.

While the load-receiving top plates in the various embodiments, and particularly those in Figs. 4-6, are shown as being made of metal, this is not absolutely necessary. It is necessary, however, that these top plates be made of relatively rigid and sturdy material which by its rigidity tends to distribute the load downwardly over a large area of the underlying structure, so that the underlying structure, and particularly the bottom member thereof, may be operatively effective substantially throughout its entire contact area with the supporting surface extending underneath, and that they be made of material which is not easily marred by the load-bearing element.

The structures shown in Figs. 4, 5 and 6 may be produced by machining, without requiring any punching, forming or molding operation as is the case in Figs. 1-3 and Figs. 7 and 8, respectively.

The virtue of using synthetic material as indicated in connection with the embodiments shown in Figs. 4-8, is that these materials have sufficient inherent rigidity to prevent warping when used for supporting loads as described herein and as indicated in the drawings, thus substantially uniformly utilizing substantially the entire bottom area for load-transmitting purposes to the supporting surface underneath, and yet these materials have a certain degree of resiliency which is beneficial particularly when the corresponding device is used as a support under the leg of a vibrating body, for example, a musical instrument. These materials therefore aid in absorbing or damping the vibrations, benefitting the tone quality of the corresponding instrument. The phenomenon of "cold flow" is substantially avoided by the large contact area provided between the base plate and its associated top plate. Caster cups made according to the invention have been tested by a commercial testing laboratory and have been found to support loads up to 11,000 pounds without showing any visible distortion.

The structure shown in Fig. 9 has the virtue of low cost in production. It comprises a relatively thin base plate 48 which may be made of metal, with ears 49 punched out from it to hold in position the pad 50 which may be made of relatively resilient material, and forms the central depression 51 for receiving and centering the load-bearing element. The pad 51 may be provided with a metallic top plate for receiving the load-bearing element.

All the embodiments disclosed have certain features in common. For example, each structure furnishes, first, a generally platelike, generally flat device the thickness of which does not exceed approximately ⅜″ throughout any portion thereof. In the case of the embodiments shown in Figs. 1, 7 and 8, this dimension is less than ¼″. The advantage resulting from these dimensions resides in economy in the use of materials. Second, the deepest point of the central depression in each device is spaced from the plane of its bottom contact surface by ³⁄₁₆″ or less. Specifically, in the structures made in accordance with Figs. 1-3, 5, 7 and 8, the distance is approximately ⅛″ or less; and in the structures shown in Figs. 4 and 6 the distance is approximately ³⁄₁₆″ or less; while the distance in the structure shown in Fig. 9 is just a trifle more than ⅛″. These dimensions furnish the important advantage of placing the supporting point for the load-bearing element very close to the supporting surface, thereby giving further advantages which will be realized from the following discussion with reference to Fig. 10.

The prominently drawn horizontal line in Fig. 10 designates the bottom plane of the contact surface of the new device. The prominently drawn curved line A designates the central top depression, the deepest point of which is assumed to be spaced from the bottom plane by approximately ³⁄₁₆″. The curved line B designates a central depression, the deepest point of which is assumed to be spaced from the bottom plane by about ¼″.

The dimensions 1¼″—1½″—2″ and 2½″, at the bottom of the diagram indicate the radii of four devices, assumed, for the sake of example, to be circular in shape, and thus having their respective outer edges at points W—X—Y and Z, respectively. We thus have four devices with diameters of 2.5"—3"—4" and 5", respectively. These devices may be generally square instead of circular, and the bottom dimensions will thus refer to the distance from the center to the nearest outer edges thereof, giving us devices which are 2.5—3—4—5 inches square, respectively. The resulting operatively effective contact areas (with supporting surfaces) are indicated at the right of Fig. 10. The areas indicated are approximate, fractions having been neglected, and the rounding of the corners in the case of square structures having also been neglected.

The diagram shows that the smallest embodiments of 2.5" diameter or 2.5" square will give us operatively effective contact areas of about 5 and 6 square inches, respectively. This feature is therefore common to all embodiments. The largest assumed embodiments of 5" diameter or 5" square will result in operatively effective contact areas of 20 and 25 square inches, respectively.

The smallest embodiment W, of 2.5" diameter or 2.5" square has been included mainly for the purpose of comparison. It will probably be rarely used in practice, and we may therefore assume that the smallest contact areas which will result in most instances of use will be on the order of approximately 7 to 9 square inches. The largest size Z, of 5" diameter or 5" square, as indicated in Fig. 10, will probably satisfy any ordinary requirements for large devices of this type for home use.

The lines drawn from the outer edge of any one of the embodiments through the deepest point of the depression A will result in the angles indicated at the left of Fig. 10. The smallest device W of 2.5" diameter or 2.5" square, will thus produce an angle of less than 9°, while the largest device Z will produce an angle of less than 5°. In most of the devices, for example, Figs. 1, 2, 3, 5, 7, 8 and 9, the angle will be appreciably smaller than indicated, because the distance between the deepest point of the depression is appreciably smaller than 3/16" and, if we assume the distance to be about 1/8" (Figs. 1, 2, 3, 5, 7, 8 and 9), the angles produced by the four assumed structures will be about 7°—5°—4° and 3°, respectively.

It should be observed, for comparison, that a device W, of 2.5" diameter or 2.5" square, with the deepest point of the depression B spaced from the plane of the bottom surface by 1/4", would produce an angle of more than 12°. The corresponding angle produced by the largest embodiment would be in the neighborhood of about 9°.

Another common feature resides in the dimensional relationship between the vertical distance from the central point of the depression B to the plane of the bottom contact surface and the lateral distance from a vertical line drawn through the central point of the depression to the outer edge of the device. If we assume this vertical distance to be about 1/8", in any of the embodiments W—X—Y—Z (see also Figs. 1 and 4—9), the noted lateral distance will be, respectively, 10—12—16 and 20 times greater than the vertical distance; and, if the latter is assumed to be on the order of about 3/16", as shown in Figs. 2 and 3, the lateral distance will be in the four respective embodiments, in round figures, 6—8—10 and 13 times greater than the vertical distance. The lateral distance therefore is in any case always in excess of about 6 times the vertical distance, and will be in most cases about 8 times greater, because it may be assumed that embodiments of the size X and larger will be more frequently used than the small size indicated in Fig. 10 at W.

The space marked C in Fig. 10 indicates the distance from a peripheral point of the central depression A or B to an outer edge of the device W, which will be about 5/8", or about 5 times the depth of the central depression, if such depth is assumed to be about 1/8", as shown in Figs. 1 and 4—9, and over 3 times the depth, if it is on the order of about 3/16", as shown in Figs. 2 and 3. The corresponding figures for the successively larger embodiments X—Y and Z, each with a central depression about 1/8" deep, will be about 7—11 and 15 times the depth; and, if we assume the depth to be about 3/16", they will be about 4—7 and 10 times such depth. Another feature also common to all embodiments therefore is that the distance from a peripheral point of the central depression to an outer edge of the base member is on the order of about 3 times the depth of the central depression, or more. In most practical instances this distance will be on the order of about 4 times the depth of the depression, or more, as in the case of the embodiment X and larger embodiments, because the smallest size W will probably be relatively rarely used, as mentioned before.

The figures and dimensions given will also apply in embodiments of oblong, elliptic, rectangular, etc., shape where the nearest edge of the base member is at the points W—X—Y—Z, respectively, and such embodiments will of course give still more favorable conditions.

The dimensional features which are common to the various embodiments may now be briefly summarized:

The thickness of the new device, in any of its embodiments, at any point throughout its body is less than 3/8", and the distance from a central point of the depression to the plane of the bottom surface is always about 1/4" or less and, as shown, actually about 3/16" or less. The operatively effective contact area is always in excess of about 5 square inches and in most cases, assuming the smallest practical embodiment to be 3" in diameter or 3" square, or of a different but similarly dimensioned shape, it will be about 7 square inches or more. The angle formed by a line drawn from the nearest edge of the device through a central point of the depression with the plane of the bottom surface will always be less than 12° and about 9° or less, and in most practical embodiments it will be about 7° or less. The distance from a peripheral point of the central depression to an outer edge of the device will always be at least 3 times the depth of the depression, and in most practical instances it will be on the order of at least about 4 to 7 times such depth, because it can be assumed that embodiments X and larger, with depressions about 1/8" to 3/16" deep, will predominate in practical use. Finally, the lateral distance measured from a vertical line drawn through the central point of the depression to an outer edge of the device will always be at least about 6 times the vertical distance from such central point to the plane of the bottom surface.

In the case of the specific embodiments shown in Figs. 1, 7 and 8, the thickness of the device at any point throughout its entire extent will be about 1/4" or less. In the case of the species shown in Figs. 1, 2, 3, 5, 7, 8 and 9, the distance from a central point of the depression to the plane of the bottom surface will be about 1/8" or less, and the angle formed with the plans of the bottom surface by a line drawn from the edge of the device through the central point of the depression will always be less than 7° and in most practical instances about 5° or less.

The various dimensions and their interaction in the practical use of the invention are believed to contribute to the economy of production of the new devices and to the favorable and efficient operation thereof. A minimum of material is used exactly where needed to give the intended operation. The piece of equipment to be supported is elevated from the underlying supporting surface by only a very small, and in most instances practically negligible amount. The very small angles formed along lines drawn through the central points of the central depressions of the devices with the planes of the bottom surfaces thereof counteract and favor the damping of vibrating forces, thus contributing, in the case of musical instruments, to the improvement of the tone quality; and they also assist in efficiently counteracting and absorbing angular forces which attempt to displace the corresponding piece of equipment relative to the supporting surface, thus avoiding its creeping and therewith substantially eliminating the creeping and buckling of floor coverings. These small angles, furthermore, minimize and to all practical purposes eliminate the tendency of the device to tip in the presence of angular forces, thus contributing toward the uniform utilization of the entire potential contact area for supporting purposes in engagement with the supporting surface extending underneath.

The features brought out in the foregoing explanations will be appreciated upon assuming the use of a supporting device which elevates a piece of equipment by an appreciable amount from its supporting surface. The angle drawn from the outer edge of such a device through the point where the caster or caster wheel rests thereon will then be correspondingly large, and the larger it is the smaller will be the damping effect and the greater will be the tendency of the device to tip on its edge in response to angular forces exerted thereon by the piece of equipment, thus preventing efficient use of the potential contact area of the device with the supporting surface. In the case of the invention, such angular forces are controlled, and substantially the entire potential bottom area of the device is always operatively effective to support the load.

Modifications above and beyond those discussed in the foregoing explanations are possible. For example, the device of Fig. 7 may be modified by forming the load-receiving top plate, as shown in Fig. 7a. The material of the top plate is bent upon itself at 40a to form a laterally inwardly directed recess 51 from which extends the skirt portion 39a forming the peripheral bead also shown in Fig. 7. The material of the base plate 38a will flow into the recess 51, during the molding process, locking the peripheral top portion of the base plate to the load-receiving top plate. The structure shown in Fig. 8 may be similarly modified.

Rubber or rubberlike material may take the place of the synthetic material shown in Figs. 7–8. The structure shown in Fig. 7a will serve particularly well with rubber, because the peripheral top portion will be locked against peeling in the recess 51, and downwardly as well as laterally outwardly effective pressure will be transmitted to the peripheral portion of the rubber plate by the bead carried by the skirt 39a, thus preventing damage to the rubber.

Means may be provided for removably fastening the supporting device, in any of the embodiments shown, to the load-bearing element, particularly in cases where the load-bearing element is in the form of a caster button, for example, at the free end of the leg of a piece of furniture. Such means may take the form of a small locking pin having slightly enlarged ends for insertion into holes formed in the caster button and in the top plate of the corresponding supporting device, respectively. It is also possible to make either the top plate of the supporting device or part thereof, or preferably the caster button, in the form of a permanent magnet which will hold the device removably in position under the load-bearing element. Such means will be useful especially in connection with pieces of furniture, for example, chairs or the like, which are frequently moved about.

The term "floor covering" includes, of course, carpets and rugs, as well as cork or linoleum coverings or the like.

It will be seen from the explanations given above that changes may be made within the scope and spirit of the appended claims.

I claim:

1. A device for supporting a load-bearing element in the manner of a caster cup comprising a generally plate-like generally flat base member made of moldable plastic material with its opposite sides extending substantially in parallel planes, a disklike metallic member having a central depression formed therein and having a flange extending radially outwardly from said depression, said flange having a first portion which is elevated relative to the plane of the deepest point of said depression and a second portion which is disposed in a plane substantially coinciding with the plane of said deepest point, at least said second portion of said flange being embedded and molecularly bonded in the material of said base member along an area between the opposite sides thereof securing said disklike metallic member substantially permanently and relatively fixed with respect to said base member, said central depression formed in said disklike metallic member being adapted to receive a load-bearing element in load-transfer engagement therewith.

2. The structure defined in claim 1, wherein the outer surface of said first portion of said flange of said disklike metallic member which is radially adjacent said central depression is flush with the surface of the corresponding side of said base member.

References Cited in the file of this patent

UNITED STATES PATENTS

| | | |
|---|---|---|
| 240,027 | Jones | Apr. 12, 1881 |
| 254,310 | Haring | Feb. 28, 1882 |
| 700,977 | Olsen | May 27, 1902 |
| 1,069,141 | Jones | Aug. 5, 1913 |
| 1,345,987 | Bocking | July 6, 1920 |
| 1,670,853 | Gebbard | May 22, 1928 |
| 1,861,095 | Schacht | May 31, 1932 |
| 1,982,138 | Herold | Nov. 27, 1934 |
| 2,699,628 | Auer | Jan. 18, 1955 |

FOREIGN PATENTS

| | | |
|---|---|---|
| 19,325 | Australia | Apr. 15, 1930 |